United States Patent
Jeong et al.

(10) Patent No.: US 10,040,206 B2
(45) Date of Patent: Aug. 7, 2018

(54) VARIABLE STIFFNESS ROBOTIC JOINT SYSTEM

(71) Applicant: Korea University Research and Business Foundation, Seoul (KR)

(72) Inventors: Hyun-Hwan Jeong, Sejong-si (KR); Joo-No Cheong, Pohang-si (KR); Bong-Ki Kang, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/539,516

(22) PCT Filed: Aug. 28, 2015

(86) PCT No.: PCT/KR2015/009046
§ 371 (c)(1),
(2) Date: Jun. 23, 2017

(87) PCT Pub. No.: WO2016/111436
PCT Pub. Date: Jul. 14, 2016

(65) Prior Publication Data
US 2018/0009116 A1    Jan. 11, 2018

(30) Foreign Application Priority Data

Jan. 5, 2015 (KR) .......................... 10-2015-0000876

(51) Int. Cl.
*B25J 17/02* (2006.01)
*B25J 17/00* (2006.01)
(Continued)

(52) U.S. Cl.
CPC .............. *B25J 17/00* (2013.01); *B25J 9/102* (2013.01); *B25J 17/0208* (2013.01); *B25J 18/04* (2013.01)

(58) Field of Classification Search
CPC . B25J 17/0208; B25J 17/0233; B25J 17/0225
See application file for complete search history.

(56) References Cited

U.S. PATENT DOCUMENTS 4,884,941 A * 12/1989 Kazerooni ................ B24B 9/00
                                                    414/744.5
4,897,930 A *  2/1990 Cusack ................. B23P 19/102
                                                    33/520
(Continued)

FOREIGN PATENT DOCUMENTS

| JP | 5062675 B2 | 10/2012 |
|---|---|---|
| JP | 2014-46417 A | 3/2014 |
| KR | 10-0835908 B1 | 6/2008 |

*Primary Examiner* — Gregory Prather
(74) *Attorney, Agent, or Firm* — NSIP Law

(57) ABSTRACT

The present invention relates to a variable rigidity robot joint system including a first driving module and a second driving module generating torque which is rotated on a first direction, a first rotating module changing rotations of the first driving module and the second driving module into rotations on a second direction intersecting the first direction when the first and second driving modules rotate in directions in which a joint is rotated in a same direction, thereby rotating the joint, a rigidity-providing member providing rigidity by elastically supporting a rotational movement of the first rotating module on the second direction, and a second rotating module changing rotations of the first driving module and the second driving module into a linear motion in the first direction when the first and second driving modules rotate in directions in which the joint is rotated in different directions.

15 Claims, 10 Drawing Sheets

(51) Int. Cl.
B25J 9/10 (2006.01)
B25J 18/04 (2006.01)

(56) References Cited

U.S. PATENT DOCUMENTS

| | | | |
|---|---|---|---|
| 5,125,759 A * | 6/1992 | Chun | B25J 17/0208 |
| | | | 403/220 |
| 5,632,590 A * | 5/1997 | Pearson | B25J 15/0616 |
| | | | 294/907 |
| 7,650,819 B2 * | 1/2010 | Haynes | B64C 27/001 |
| | | | 310/51 |
| 2012/0266711 A1 * | 10/2012 | Chen | B25J 17/0208 |
| | | | 74/490.05 |

* cited by examiner

VARIABLE STIFFNESS ROBOTIC JOINT SYSTEM

CROSS REFERENCE TO RELATED APPLICATIONS

This application is a National Phase entry of PCT Application No. PCT/KR2015/009046, filed on Aug. 28, 2015, which claims priority under 35 U.S.C. § 119(e), 120 and 365(c) to Korean Patent Application No. 10-2015-0000876, filed on Jan. 5, 2015.

TECHNICAL FIELD

The present invention relates generally to a variable stiffness robotic joint system. More particularly, the present invention relates to a variable stiffness robotic joint system, in which two driving motors are involved in simultaneously controlling the motion and the stiffness of the joint.

BACKGROUND ART

Robots are used throughout the manufacturing industry and their use is gradually expanding to service areas. Particularly, robots are used in manufacturing at industrial sites and at service sites, and the driving range of the robots is overlapped with the human activity areas, thus driving safety of the robots in overlapping areas is important.

Accordingly, various robot safety technologies have been developed to minimize damage caused by collision in overlapping activity areas between human and robot. As an example of these safety robot technologies, variable stiffness joint system is becoming an important core technology.

Realizing a high-efficiency robot joint system that achieves high efficiency at low cost is also one of the big tasks of robot research. It is necessary to develop a high-performance robot joint system that meets the needs of precise positioning control performance and safe contact work performance at the same time.

As an example of a variable stiffness robotic joint system, "Driving device" has been disclosed in Japanese Patent Application Publication No. 2014-046417, in which the stiffness of the rotation direction of a joint is adjusted by using a spring.

As another example, "Double actuator unit, double actuator apparatus having the same, and control method thereof" has been disclosed in Korean Patent No. 10-0835908, in which a joint is rotated and the stiffness is adjusted by using two motors.

However, the technology disclosed in the document of Korean Patent is disadvantageous in that since one motor is only involved in the rotation of the joint, and the other motor is only involved in the stiffness control, joint motion is determined only by the output of one motor while using two motors, and the other motor is used only for adjustment of stiffness, so it is not efficient for motor use.

DISCLOSURE

Technical Problem

Accordingly, the present invention has been made keeping in mind the above problems occurring in the prior art, and an object of the present invention is to provide a variable stiffness robotic joint system, in which two driving motors are involved in simultaneously controlling the motion and the stiffness of the joint so as to increase the efficiency of utilization of the driving motors while providing a flexible joint structure.

Technical Solution

In order to accomplish the above object, the present invention provides a variable stiffness robotic joint system including: a first driving module and a second driving module configured to respectively generate torque which is rotated on a first direction; a first rotating module configured to change rotations of the first driving module and the second driving module into rotations on a second direction intersecting the first direction when the first driving module and the second driving module rotate in directions in which a joint is rotated in a same direction, thereby rotating the joint; a stiffness-providing member configured to provide stiffness by elastically supporting a rotational movement of the first rotating module on the second direction; and a second rotating module configured to change rotations of the first driving module and the second driving module into a linear motion in the first direction when the first driving module and the second driving module rotate in directions in which the joint is rotated in different directions, thereby adjusting an elastic force of the stiffness-providing member.

Herein, the variable stiffness robotic joint system may further include: a first rotation shaft configured to rotate on the first direction according to the rotation of the first driving module, thereby transmitting the torque of the first driving module to the first rotating module and the second rotating module; and a second rotation shaft configured to rotate on the first direction according to the rotation of the second driving module, thereby transmitting the torque of the second driving module to the first rotating module and the second rotating module.

Further, the first rotating module may include a first joint shaft rotation gear configured to rotate on the second direction to rotate the joint, and a pair of first cross shaft rotation gears respectively axis-connected to the first rotation shaft and the second rotation shaft and configured to rotate in engagement with the first joint shaft rotation gear so as to rotate the first joint shaft rotation gear when the first driving module and the second driving module rotate in directions in which the joint is rotated in the same direction; and the second rotating module may include a sliding frame configured to vary the elastic force of the stiffness-providing member according to sliding movement in the first direction of the sliding frame, a second joint shaft rotation gear configured to rotate on the second direction; and a pair of second cross shaft rotation gears respectively axis-connected to the first rotation shaft and the second rotation shaft and configured to rotate in engagement with the second joint shaft rotation gear so as to move the sliding frame in the first direction when the first driving module and the second driving module rotate in directions in which the joint is rotated in different directions.

Further, the stiffness-providing member may include a pair of elastic members configured to respectively elastically press the pair of first cross shaft rotation gears in the first direction.

Further, the sliding frame may include a pair of first gear plates configured to support opposite sides of each of the second cross shaft rotation gears in the first direction, and to move with the pair of the second cross shaft rotation gears when the second cross shaft rotation gears linearly move in the first direction in engagement with the second joint shaft rotation gear according to rotations of the first rotation shaft and the second rotation shaft, thereby linearly moving the sliding frame in the first direction.

Further, the sliding frame may further include a second gear plate disposed between the first gear plates and the pair of first cross shaft rotation gears, and formed with a pair of through holes through which the first rotation shaft and the second rotation shaft pass, respectively; and the first rotating module may further include a pair of stoppers, each of the stoppers disposed at opposite sides of the pair of first cross shaft rotation gears, respectively with the second gear plate disposed between the pair of stoppers and the pair of first cross shaft rotation gears, and connected to the first cross shaft rotation gears through the through holes, respectively thereby being stopped by the through holes at the opposite sides of the first cross shaft rotation gears, respectively and each of the elastic members elastically presses each of the stoppers in the first direction, respectively, to provide the elastic force to each of the pair of first cross shaft rotation gears, respectively.

Further, the elastic members may provide the elastic force respectively to the first cross shaft rotation gears in the first direction, so as to elastically support forward torque and reverse torque transmitted from an outside through the joint and the first cross shaft rotation gears.

Further, the first cross shaft rotation gears may be provided on the first rotation shaft and the second rotation shaft, respectively, so as to be freely movable in the first direction, thereby compressing or releasing the elastic members, respectively.

Further, the variable stiffness robotic joint system may further include: a shaft supporting part configured to support each of the first rotation shaft and the second rotation shaft to be rotatable in the first direction; and a main frame including a plate guide supporting the sliding frame to be linearly movable in the first direction.

Further, the main frame may further include a pair of support plates spaced apart from each other in the first direction; and the plate guide may include a plurality of fixed shafts provided between the support plates along the first direction, and sliding bearing modules provided on the sliding frame to move linearly along each of the fixed shafts.

Further, the sliding frame may further include a connecting plate connecting the pair of first gear plates and the second gear plate; the pair of first gear plates may be disposed between the pair of support plates, and the second gear plate may be disposed on a periphery of the pair of support plates; and one of the pair of support plates, which is disposed between the first gear plates and the second gear plate, may be formed with a plate through hole through which the connecting plate passes.

Further, the main frame may further include a main plate extending in the first direction to connect the pair of support plates to each other; and the first joint shaft rotation gear and the second joint shaft rotation gear may be rotatably provided on the main plate.

Further, each of the first driving module and the second driving module may include: a driving motor configured to generate torque; and at least one torque-transmitting member configured to transmit the torque of the driving motor to the first and the second rotation shafts.

Further, the driving motor may be mounted to the sliding frame such that a rotation axis of the driving motor is formed in the first direction; and the torque-transmitting member may be provided in a form of transmission gears that rotate by being engaged with each other.

Further, each of the first joint shaft rotation gear and the second joint shaft rotation gear may be provided in a form of a worm wheel or a ring gear; and each of the first cross shaft rotation gears and the second cross shaft rotation gears may be provided in a form of a worm gear rotating in engagement with the worm wheel or in a form of a pinion gear rotating in engagement with the ring gear.

Advantageous Effects

According to the present invention, there is provided a variable stiffness robotic joint system, in which two driving motors are involved in simultaneously controlling the motion and the stiffness of the joint so as to increase the efficiency of utilization of the driving motors while providing a flexible joint structure.

Further, when torque of the joint generated by the two driving motors is smaller than the internal force of the elastic member, it is possible to realize a joint motion with a general high stiffness, that is, with an infinite stiffness; and when torque of the joint generated by the two driving motors is larger than the internal force of the elastic member, it is possible to realize a flexible joint.

BEST MODE

A variable stiffness robotic joint system according to the present invention includes: a first driving module and a second driving module configured to respectively generate torque which is rotated on a first direction; a first rotating module configured to change rotations of the first driving module and the second driving module into rotations on a second direction intersecting the first direction when the first driving module and the second driving module rotate in directions in which a joint is rotated in a same direction, thereby rotating the joint; a stiffness-providing member configured to provide stiffness by elastically supporting a rotational movement of the first rotating module on the second direction; and a second rotating module configured to change rotations of the first driving module and the second driving module into a linear motion in the first direction when the first driving module and the second driving module rotate in directions in which the joint is rotated in different directions, thereby adjusting an elastic force of the stiffness-providing member.

MODE FOR INVENTION

Hereinbelow, exemplary embodiments of the present invention will be described in detail with reference to the accompanying drawings.

Figure 1:
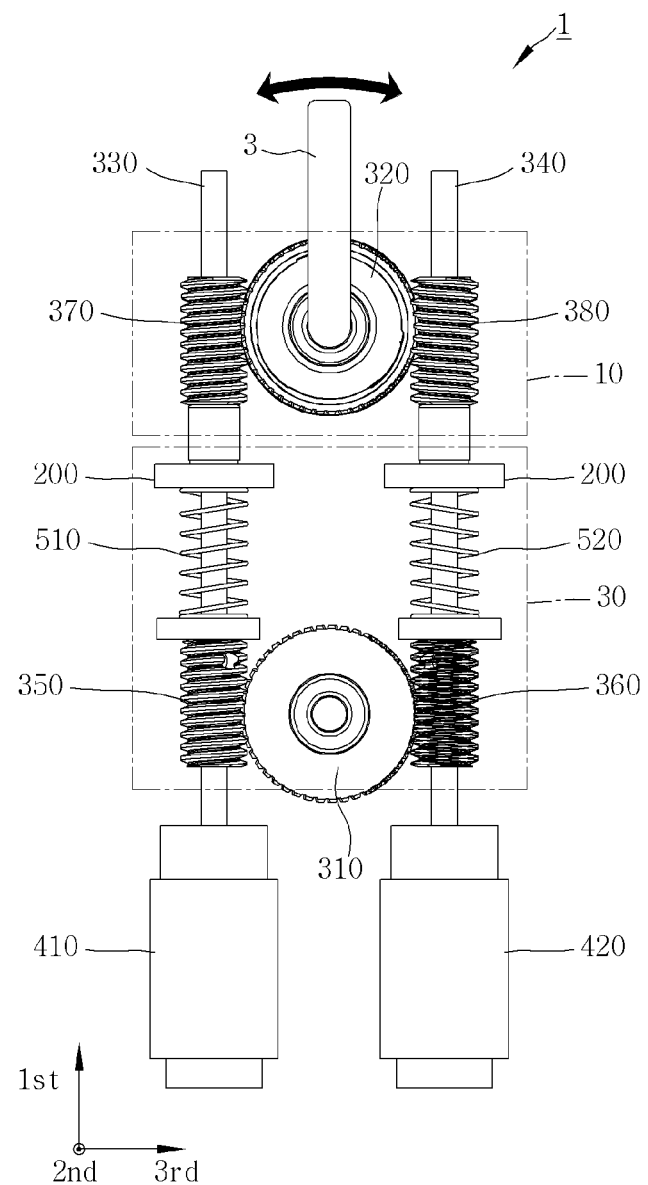
FIG. 1 shows a view of a configuration of a variable stiffness robotic joint system according to the present invention.

FIG. 1 shows a view of a configuration of a variable stiffness robotic joint system 1 according to the present invention. Referring to FIG. 1, the variable stiffness robotic joint system 1 according to the present invention includes a first driving module 410, a second driving module 420, a first rotating module 10, a second rotating module 30, and stiffness-providing members 510 and 520.

The first driving module 410 and the second driving module 420 respectively generate torque which is rotated on a first direction 1st.

The first rotating module 10 is connected to a joint 3 so as to rotate the joint 3 on a second direction 2nd intersecting the first direction 1st. Herein, the first rotating module 10 is configured to change the rotation of the first driving module 410 and the second driving module 420 into rotation on the second direction 2nd when the first driving module 410 and the second driving module 420 rotate in directions in which the joint 3 is rotated in the same direction, thereby rotating the joint 3.

The stiffness-providing members 510 and 520 provide stiffness of the variable stiffness robotic joint system 1 according to the present invention by elastically supporting a rotational movement of the first rotating module 10 on the second direction 2nd. Thereby, when a force is exerted in the direction of rotation of the joint 3 by an external force, stiffness is provided by the elastic force of the stiffness-providing members 510 and 520.

The second rotating module 30 is configured to change the rotation of the first driving module 410 and the second driving module 420 into a linear motion in the first direction 1st when the first driving module 410 and the second driving module 420 rotate in directions in which the joint 3 is rotated in different directions, thereby adjusting the elastic force of the stiffness-providing members 510 and 520, and thus it is possible to adjust the stiffness of the variable stiffness robotic joint system 1 according to the present invention.

According to the above configuration, when both the first driving module 410 and the second driving module 420 rotate in directions in which the joint 3 is rotated in a clockwise direction, or rotate in directions in which the joint 3 is rotated in a counterclockwise direction, torque of both the first driving module 410 and the second driving module 420 is transmitted to the first rotating module 10 to rotate the joint 3, whereby it is possible to provide a large output by using two driving modules with a small output.

On the contrary, in the case where the first driving module 410 rotates in the direction in which the joint 3 is rotated in the clockwise direction and the second driving module 420 rotates in the direction in which the joint 3 is rotated in the counterclockwise direction, or vice versa, by the torque of the first driving module 410 and the second driving module 420, at least a part of the second rotating module 30 moves linearly in the first direction 1st, adjusting the elastic force of the stiffness-providing members 510 and 520, whereby it is possible to adjust the stiffness of the variable stiffness robotic joint system 1 according to the present invention.

Thereby, the two driving modules are used to rotate the joint 3 and regulate the stiffness simultaneously, so the driving efficiency of a driving module such as a driving motor can be increased.

Herein, as shown in FIG. 1, the variable stiffness robotic joint system 1 according to the present invention may include a first rotation shaft 330 and a second rotation shaft 340.

The first rotation shaft 330 is configured to rotate on the first direction 1st according to the rotation of the first driving module 410, thereby transmitting the torque of the first driving module 410 to the first rotating module 10 and the second rotating module 30. Further, the second rotation shaft 340 is configured to rotate on the first direction 1st according to the rotation of the second driving module 420, thereby transmitting the torque of the first driving module 410 to the first rotating module 10 and the second rotating module 30.

In other words, in an embodiment according to the present invention, the torque of the first driving module 410 is transmitted to the first rotating module 10 and the second rotating module 30 through one first rotation shaft 330, and similarly, the torque of the second driving module 420 is transmitted to the first rotating module 10 and the second rotating module 30 through one second rotation shaft 340. Of course, other power transmission structures are applicable as well, which can simultaneously transmit the torque of the first driving module 410 and the torque of the second driving module 420 to the first rotating module 10 and the second rotating module 30, respectively.

Meanwhile, as shown in FIG. 1, the first rotating module 10 according to the present invention may include a first joint shaft rotation gear 320 and a pair of first cross shaft rotation gears 370 and 380. The first joint shaft rotation gear 320 rotates on the second direction 2nd, and a pair of first cross shaft rotation gears 370 and 380 rotate respectively in engagement with the first joint shaft rotation gear 320, and rotate on the first direction 1st.

As shown in FIG. 1, in the present invention, it is exemplified that the first joint shaft rotation gear 320 is provided in the form of a worm wheel, and the pair of first cross shaft rotation gears 370 and 380 are provided in the form of worm gears. Hereinbelow, the first joint shaft rotation gear 320 is defined as a first worm wheel 320, and the first cross shaft rotation gears 370 and 380 are defined as first worm gears 370 and 380.

The first worm wheel 320 rotates on the second direction 2nd, thereby rotating the joint 3. The pair of first worm gears 370 and 380 are axis-connected respectively to the first rotation shaft 330 and the second rotation shaft 340, and rotate respectively in engagement with the first worm wheel 320 at opposite sides in a third direction 3rd of the first worm wheel 320. Further, when the first driving module 410 and the second driving module 420 rotate in directions in which the joint 3 is rotated in the same direction, the pair of first worm gears 370 and 380 rotate the first worm wheel 320 by being engaged therewith, thereby rotating the joint 3.

Meanwhile, as shown in FIG. 1, the second rotating module 30 according to the present invention may include a sliding frame 200, a second joint shaft rotation gear 310, and a pair of second cross shaft rotation gears 350 and 360. The second joint shaft rotation gear 310 rotates on the second direction 2nd, and the pair of second cross shaft rotation gears 350 and 360 rotate respectively in engagement with the second joint shaft rotation gear 310, and rotate on the first direction 1st.

As shown in FIG. 1, in the present invention, it is exemplified that the second joint shaft rotation gear 310 is provided in the form of a worm wheel, and the pair of second cross shaft rotation gears 350 and 360 are provided in the form of worm gears. Hereinbelow, the second joint shaft rotation gear 310 is defined as a second worm wheel 310, and the second cross shaft rotation gears 350 and 360 are defined as second worm gears 350 and 360.

The sliding frame 200 is configured to vary the elastic force of the stiffness-providing members 510 and 520 as they slidingly move in the first direction 1st. Further, the second worm wheel 310 rotates on the second direction 2nd. Herein, the second worm wheel 310 may be spaced apart from the first worm wheel 320 in the first direction 1st.

The pair of second worm gears 350 and 360 are axis-connected respectively to the first rotation shaft 330 and the second rotation shaft 340, and rotate in engagement with the second worm wheel 310. Further, the second worm gears 350 and 360 move the sliding frame 200 along the first direction 1st when the first driving module 410 and the second driving module 420 rotate in directions in which the joint 3 is rotated in different directions, thereby controlling the sliding frame 200 to vary the elastic force of the stiffness-providing members 510 and 520.

To be more specific, the pair of second worm gears 350 and 360 are configured such that when they rotate in directions in which the second worm wheel 310 is rotated in different directions according to the rotation of the first rotation shaft 330 and the second rotation shaft 340, for example, when the left second worm gears 350 in FIG. 1 rotate in directions in which the second worm wheel 310 is rotated in the counterclockwise direction and the right second worm gears 360 in FIG. 1 rotate in a direction in which the second worm wheel 310 is rotated in the clockwise direction, the sliding frame 200 is moved upward in FIG. 1 of the first direction 1st.

On the contrary, when the left second worm gears 350 in FIG. 1 rotate in a direction in which the second worm wheel 310 is rotated in the clockwise direction and the right second worm gears 360 in FIG. 1 rotate in a direction in which the second worm wheel 310 is rotated in the counterclockwise direction, the sliding frame 200 is moved downward in FIG. 1 of the first direction 1st.

According to the above configuration, the pair of second worm gears 350 and 360 are provided to be movable along the first direction 1st along with the sliding frame 200, and in the case where a position of the second worm wheel 310 is fixed, when the pair of second worm gears 350 and 360 rotate in directions in which the first worm wheel is rotated in different directions, the pair of second worm gears 350 and 360 is moved along the second worm wheel 310 in the first direction 1st, and the sliding frame 200 provided to be movable along with the second worm wheel 310 moves in the first direction 1st, thereby adjusting the elastic force of the stiffness-providing members 510 and 520.

In the present invention, it is exemplified that the stiffness-providing members 510 and 520 are provided in the form of a pair of elastic members 510 and 520, which are respectively elastically pressing a pair of first worm gears 370 and 380 in the first direction 1st, and are compressed or released by the sliding frame 200 slidingly moving in the first direction 1st, thereby adjusting the elastic force.

According to the above configuration, reference will be made in detail to the principle in which the variable stiffness robotic joint system 1 according to the present invention makes the joint 3 rotationally move and adjusts the stiffness with reference to [Table 1]. In [Table 1], CW represents a direction in which the first worm wheel 320 and the second worm wheel 310 are rotated clockwise, and CCW represents a direction in which the first worm wheel 320 and the second worm wheel 310 are rotated counterclockwise. Here, when CW and CCW represent rotation directions of the first driving module 410 and the second driving module 420, they do not represent the absolute rotation direction of the first driving module 410 and the second driving module 420 but represent a direction in which the first worm wheel 320 and the second worm wheel 310 are rotated when the rotation is finally transmitted to the first worm wheel 320 and the second worm wheel 310. In other words, the rotation direction in which the first worm wheel 320 or the second worm wheel 310 is rotated clockwise or counterclockwise may vary according to a direction of threads of the first worm gears 370 and 380 or the second worm gears 350 and 360, so the rotation direction will be described based on the rotation direction of the joint 3, namely, the rotation direction of the first worm wheel 320 and the second worm wheel 310.

TABLE 1

| First driving module | Second driving module | Second worm wheel | First worm wheel | Sliding frame | Rotation/ Stiffness |
| --- | --- | --- | --- | --- | --- |
| CW | CW | CW | CW | — | CW rotation |
| CCW | CCW | CCW | CCW | — | CCW rotation |
| CW | CCW | — | — | down | stiffness increase |
| CCW | CW | — | — | up | stiffness decrease |

Referring to [Table 1], when the first driving module 410 and the second driving module 420 rotate in the CW direction, that is, in the direction in which the first worm wheel 320 and the second worm wheel 310 are rotated clockwise, the torque of the first driving module 410 and the second driving module 420 is transmitted to the first rotation shaft 330 and the second rotation shaft 340, and the pair of first worm gears 370 and 380 and the pair of second worm gears 350 and 360 are rotated respectively in engagement with the first worm wheel 320 and the second worm wheel 310 according to the rotation of the first rotation shaft 330 and the second rotation shaft 340, whereby the first worm wheel 320 and the second worm wheel 310 are rotated clockwise.

Accordingly, the joint 3 axis-connected to the first worm wheel 320 rotates clockwise, thereby enabling movement of the joint 3 of the variable stiffness robotic joint system 1 according to the present invention. Here, the second worm wheel 310 is also rotated clockwise, so it is rotated in a direction in which the second worm wheel 310 and the pair of second worm gears 350 and 360 are rotated clockwise, whereby the positions of the pair of first worm gears 370 and 380 and the sliding frame 200 in the first direction 1st do not change, so the stiffness does not change.

Similarly, when the first driving module 410 and the second driving module 420 rotate in the CCW direction, that is, in the direction in which the first worm wheel 320 and the second worm wheel 310 are rotated counterclockwise, the torque of the first driving module 410 and the second driving module 420 is transmitted to the first rotation shaft 330 and the second rotation shaft 340, and the pair of first worm gears 370 and 380 and the pair of second worm gears 350 and 360 are rotated respectively in engagement with the first worm wheel 320 and the second worm wheel 310 according to the rotation of the first rotation shaft 330 and the second rotation shaft 340, whereby the first worm wheel 320 and the second worm wheel 310 are rotated counterclockwise.

Accordingly, the joint 3 axis-connected to the first worm wheel 320 rotates counterclockwise, thereby enabling movement of the joint 3 of the variable stiffness robotic joint system 1 according to the present invention. Here, the second worm wheel 310 is also rotated clockwise, so it is rotated in a direction in which the second worm wheel 310 and the pair of second worm gears 350 and 360 are rotated clockwise, whereby the positions of the pair of second worm gears 350 and 360 and the sliding frame 200 in the first direction 1st do not change, so the stiffness does not change.

On the contrary, when first driving module 410 rotates clockwise and the second driving module 420 rotates counterclockwise, the first worm wheel 320 is not rotated since the pair of first worm gears 370 and 380 are rotated in directions in which the first worm wheel 320 is rotated in different directions. Herein, the first worm wheel 320 may be provided in pair in each of the first rotation shaft 330 and second rotation shaft 340 to be slidingly movable in the first direction 1st. Accordingly, the pair of first worm gears 370 and 380 are moved in one direction of the first direction 1st with respect to the first worm wheel 320, whereby the opposite first worm gears 370 and 380 can be rotated while the first worm wheel 320 is not rotated.

Herein, when first driving module 410 rotates clockwise and the second driving module 420 rotates counterclockwise, the second worm wheel 310 is not rotated since the pair of second worm gears 350 and 360 are rotated in directions in which the second worm wheel 310 is rotated in different directions, and here, each of the second worm gears 350 and 360 is moved down while being rotated along the second worm wheel 310.

Further, as the pair of second worm gears 350 and 360 are moved down, the sliding frame 200 is also moved down, compressing the pair of elastic members 510 and 520, whereby the stiffness of the variable stiffness robotic joint system 1 according to the present invention is increased.

On the contrary, when first driving module 410 rotates counterclockwise and the second driving module 420 rotates clockwise, the pair of first worm gears 370 and 380 are moved in one direction of the first direction 1st with respect to the first worm wheel 320.

Further, when first driving module 410 rotates counterclockwise and the second driving module 420 rotates clockwise, the second worm wheel 310 is not rotated since the pair of second worm gears 350 and 360 are rotated in directions in which the second worm wheel 310 is rotated in different directions, and here, each of the second worm gears 350 and 360 is moved up while being rotated along the second worm wheel 310. Further, as the pair of second worm gears 350 and 360 are moved up, the sliding frame 200 is also moved up, releasing the pair of elastic members 510 and 520, whereby the stiffness of the variable stiffness robotic joint system 1 according to the present invention is decreased.

Herein, as described above, the pair of first worm gears 370 and 380 are provided to be movable in the first direction 1st along the first rotation shaft 330 and the second rotation shaft 340, and each of the first worm gears 370 and 380 is supported by the elastic members 510 and 520, whereby the elastic members 510 and 520 become compressible or releasable as the first worm gears 370 and 380 slidingly move in the first direction 1st.

Accordingly, when the first driving module 410 and the second driving module 420 rotate in directions in which the joint 3 is rotated, one of the pair of first worm gears 370 and 380 is applied a force to slidingly move in an upward direction based on FIG. 1 of the first direction 1st, and the other is applied a force to slidingly move in a downward direction based on FIG. 1.

Here, when the torque of the joint 3 generated by the first driving module 410 and the second driving module 420 is larger than the internal force of the elastic members 510 and 520, namely, the elastic force thereof, the joint moves in a manner similar to a flexible joint with a constant stiffness. On the contrary, when the torque of the joint 3 generated by the first driving module 410 and the second driving module 420 is smaller than the internal force of the elastic members 510 and 520, the joint motion with a general high stiffness, that is, with an infinite stiffness, is possible.

Hereinafter, an actual implementation example of the variable stiffness robotic joint system 1 according to the present invention will be described in detail with reference to FIGS. 2 to 9. Herein, the basic configuration of the variable stiffness robotic joint system 1 described with reference to the FIG. 1 is applied to the actual implementation example of FIGS. 2 to 9 using the same reference numerals as in the above description.

Figure 2:
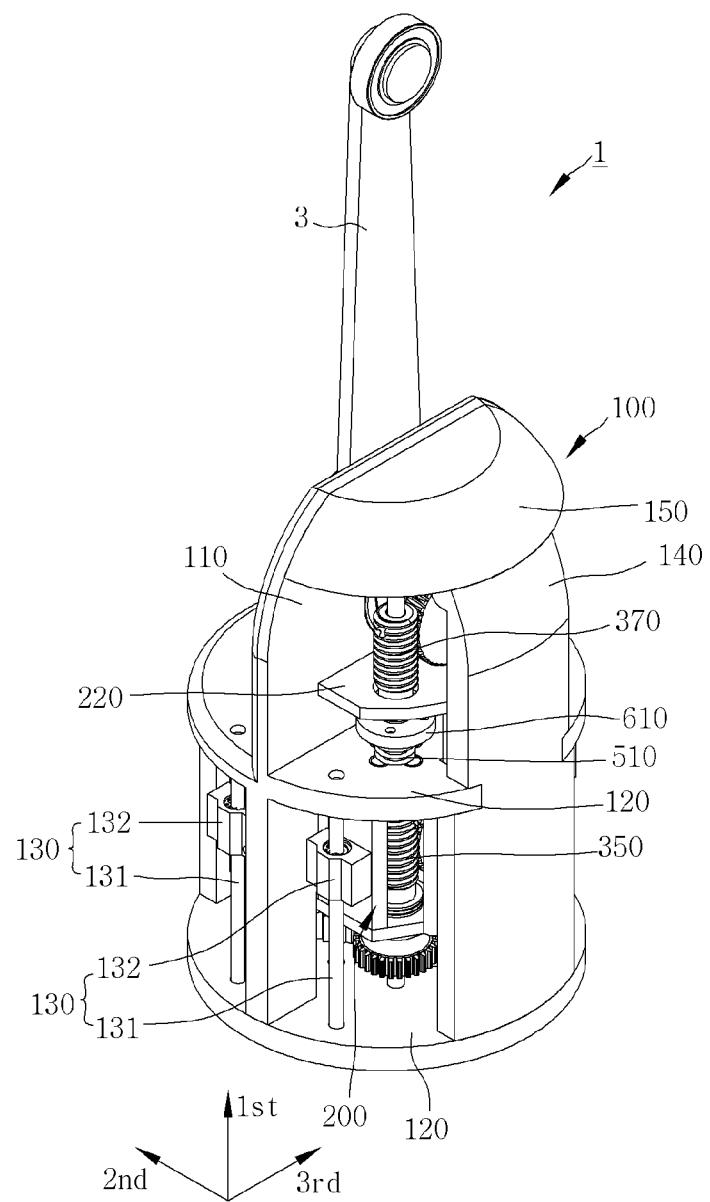
FIG. 2 shows a view of an actual implementation example of the variable stiffness robotic joint system according to the present invention.
Figure 3:
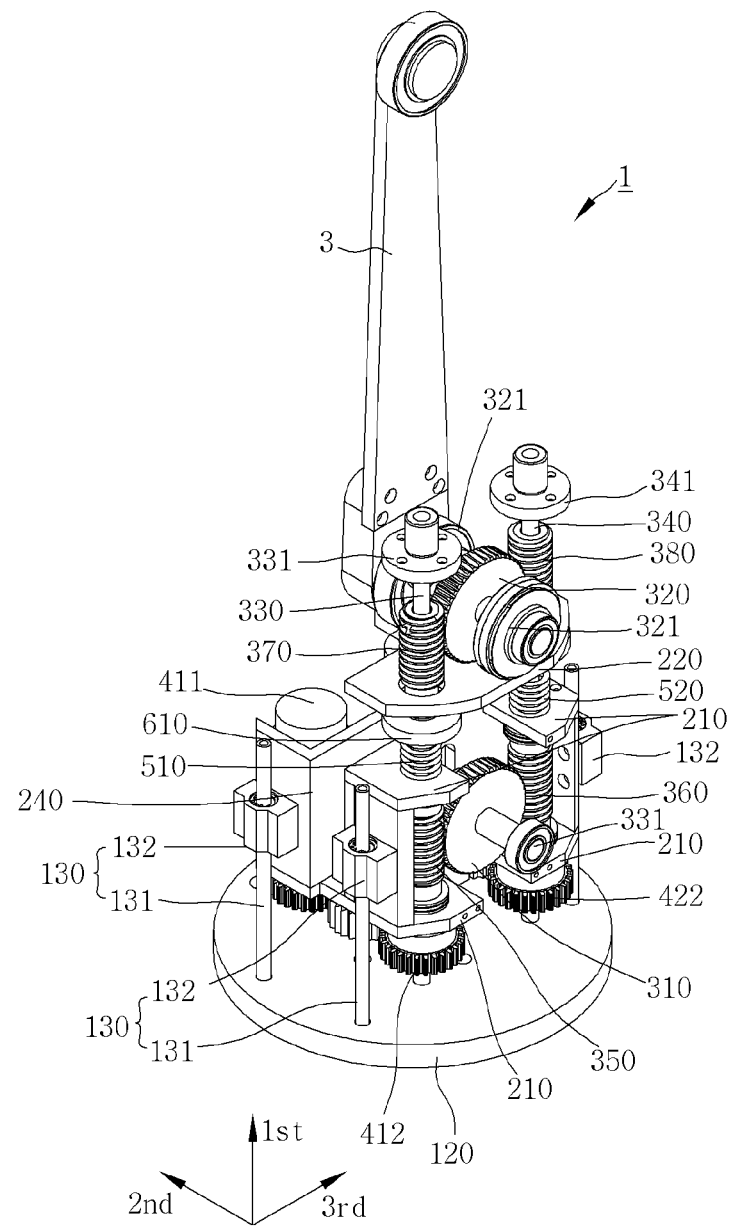
FIG. 3 shows a partial exploded perspective view of the variable stiffness robotic joint system of FIG. 2.
Figure 7:
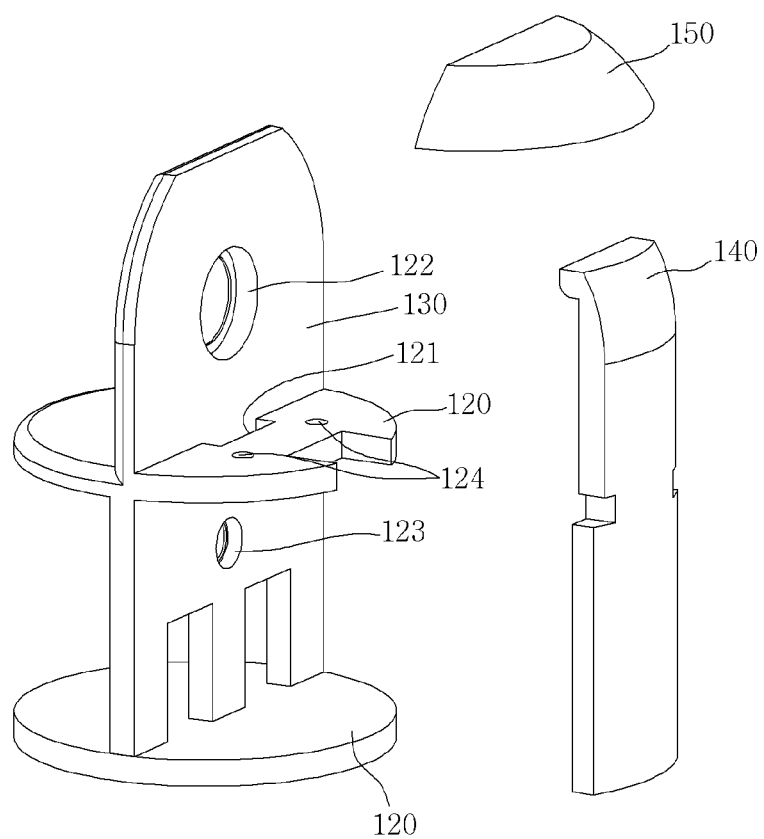
FIG. 7 shows an exploded perspective view of a main frame of the variable stiffness robotic joint system of FIG. 2.

Referring to FIGS. 2 and 7, the variable stiffness robotic joint system 1 according to the present invention may include a main frame 100 forming a basic frame. The main frame 100 according to the present invention, as shown in FIG. 7, may include a pair of support plates 120 spaced apart from each other in the first direction 1st, a main plate 110 connecting the pair of support plates 120, a roof plate 150 facing the pair of support plates 120, and a side plate 140 connecting the roof plate 150 and the support plates 120, which will be described in detail, hereinafter.

Figure 4:
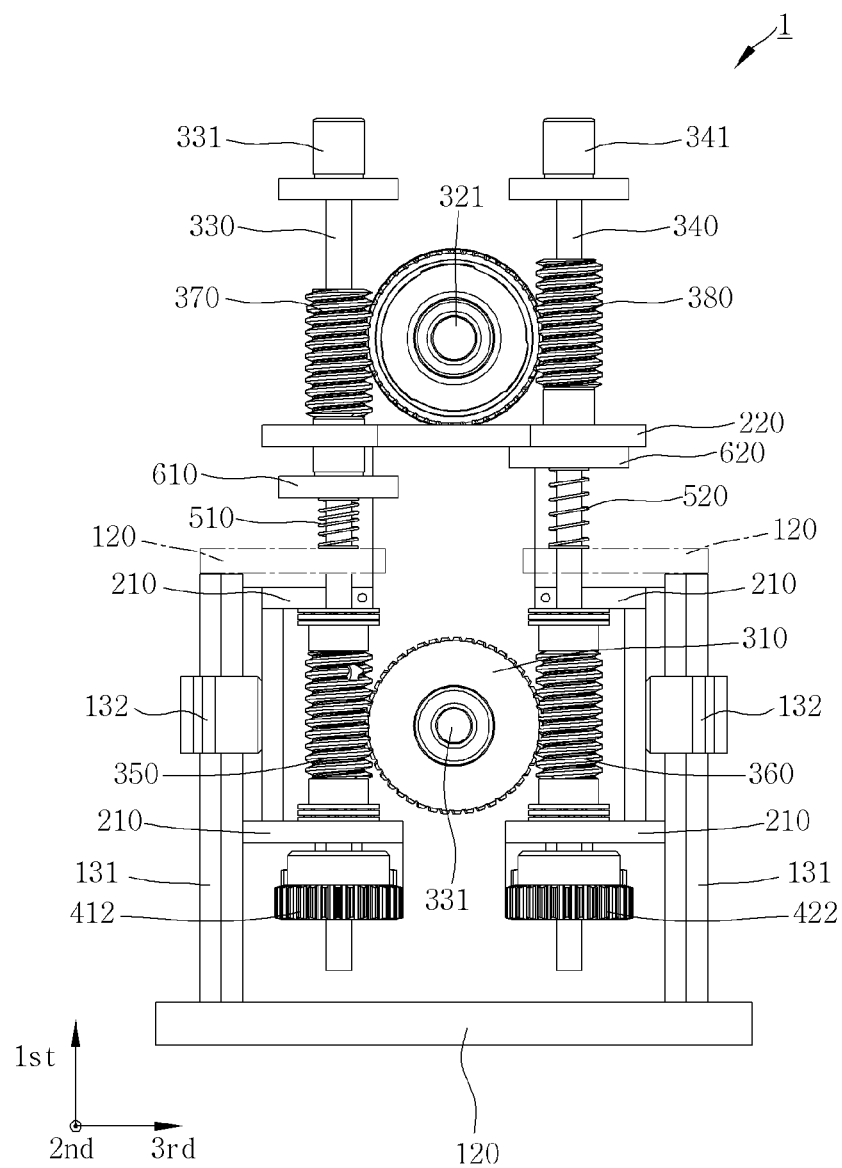
FIG. 4 shows a plan view from a second direction of FIG. 3.

The first rotation shaft 330 and the second rotation shaft 340 are provided in the main frame 100 to be rotatable on the first direction 1st, wherein as shown in FIG. 4, it is exemplified that the first rotation shaft and the second rotation shaft are provided to be apart from each other in the third direction 3rd.

Herein, the main frame 100 is formed at the top based on the first direction 1st, and may include a pair of shaft supporting parts 331 and 341 that respectively support the first rotation shaft 330 and the second rotation shaft 340 to be rotatable on the first direction 1st, wherein the pair of shaft supporting parts 331 and 341 may be provided in the roof plate 150. Here, lower ends of the first rotation shaft 330 and the second rotation shaft 340 in the first direction 1st are provided to have free cross sections.

Further, as shown in FIG. 7, an upper support plate 120 of the pair of support plates 120 of the main frame 100 is formed with through holes 124 with the first rotation shaft 330 and the second rotation shaft 340 passing therethrough.

Meanwhile, the first worm wheel 320 and the second worm wheel 310 are provided in the main plate 110 and the side plate 140 of the main frame 100 to be rotatable on the second direction 2nd. Referring to FIGS. 4 and 7, the first worm wheel 320 and the second worm wheel 310 are provided in the main frame 100 to be spaced apart from each other in the first direction 1st.

A support structure 321 such as a bearing that supports the rotation of the first worm wheel 320 on the second direction 2nd is provided at each end of the first worm wheel 320 in the second direction 2nd, and the support structures 321 are respectively mounted to the main plate 110 and the side plate 140. Here, the main frame 100 is formed with a coupling hole 111 through which the support structure 321 is mounted, and the first worm wheel 320 connected to the joint 3 through the coupling hole 111, whereby the rotation of the first worm wheel 320 can be transmitted to the joint 3.

Similarly, a support structure 331 such as a bearing that supports the rotation of the second worm wheel 310 on the second direction 2nd is provided at each end of the second worm wheel 310 in the second direction 2nd, and the support structures 331 are respectively mounted to the main plate 110 and the side plate 140. Herein, it is exemplified that the main frame 100 is formed with a coupling hole 112 through which the support structure 331 is mounted.

Meanwhile, the sliding frame 200, as shown in FIGS. 3 to 6, may include a pair of first gear plates 210 and a second gear plate 220.

The pair of first gear plates 210 rotatably support opposite ends of each second worm gears 350 and 360 in the first direction 1st. Each of the second worm gears 350 and 360 is disposed between the pair of first gear plates 210, so as described above, when the pair of second worm gears 350 and 360 are moved in the first direction 1st in engagement with the second worm wheel 310 according to the rotation of the first rotation shaft 330 and the second rotation shaft 340, as the pair of second worm gears 350 and 360 are moved in the first direction 1st, the pair of first gear plates 210 are moved in the first direction 1st, whereby the entire sliding frame 200 is moved in the first direction 1st, as described above.

Figure 5:
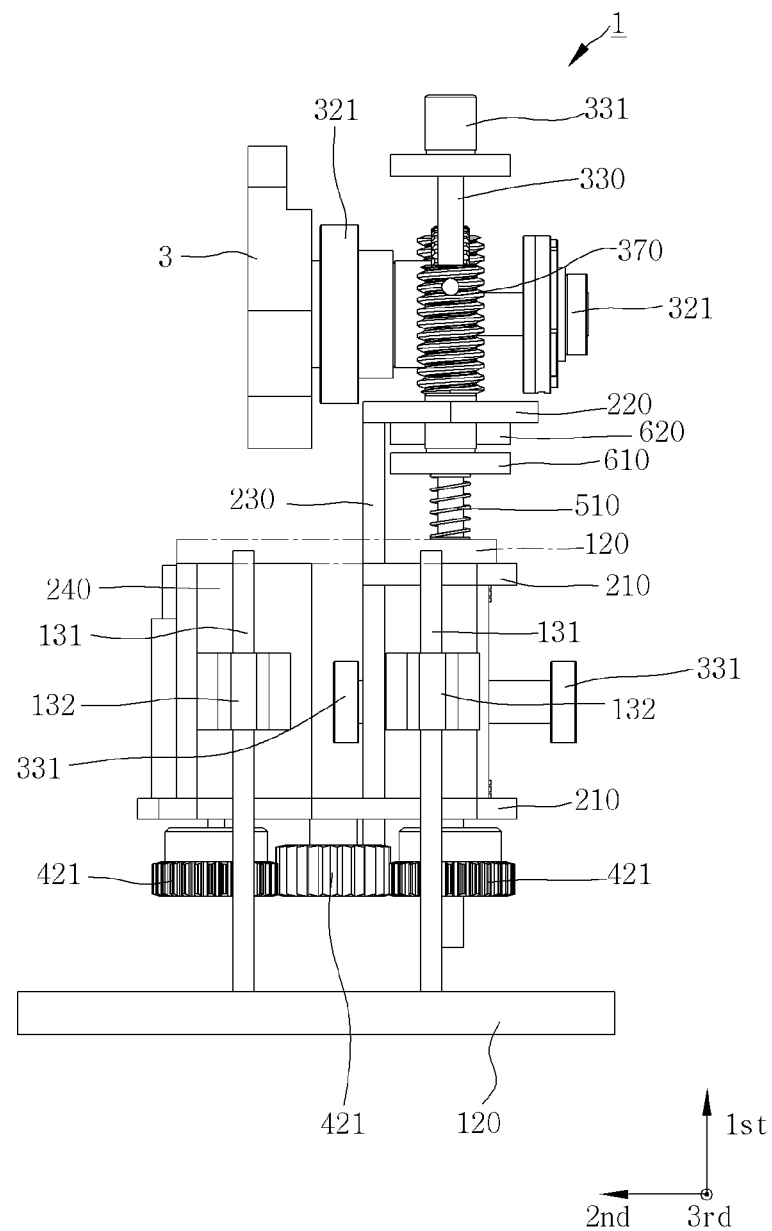
FIG. 5 shows a plan view from a third direction of FIG. 3.

Herein, as shown in FIGS. 4 and 5, the pair of first gear plates 210 according to the present invention are provided to be slidingly movable in the first direction 1st the pair of support plates 120 of the main frame 100, whereby the entire sliding frame 200 is slidingly movable in the first direction 1st.

To achieve this, it is exemplified that the main frame 100 includes at least one plate guide 130 that supports the sliding frame 200 to be linearly movable in the first direction 1st. In the present invention, it is exemplified that the plate guide 130 includes a plurality of fixed shafts 131 and sliding bearing modules 132.

Referring to FIGS. 2 to 6, the fixed shafts 131 are provided between the pair of support plates 120 in the first direction 1st. Further, the sliding bearing modules 132 are provided in the sliding frame 200 to move linearly along the fixed shafts 131, such that the sliding frame 200 is supported to be slidable in the first direction 1st.

Figure 8:
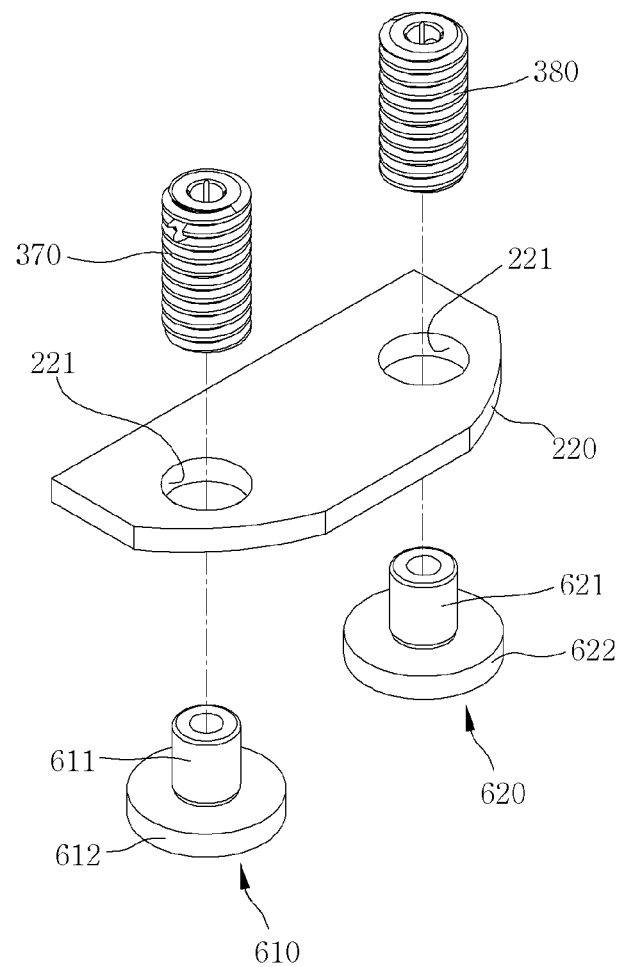
FIG. 8 shows a view of a first gear frame and a stopper of the variable stiffness robotic joint system of FIG. 2.

Meanwhile, as shown in FIG. 4, the second gear plate 220 is disposed between the first gear plates 210 and the first worm gears 370 and 380. Further, as shown in FIG. 8, the second gear plate 220 may be formed with a pair of through holes 221 with the first rotation shaft 330 and the second rotation shaft 340 passing therethrough.

Herein, the first rotating module 10 may include a pair of stoppers disposed in the first worm gears 370 and 380 with the second gear plate 220 disposed between the first rotating module and the stoppers. Each of the stoppers 610 and 620, as shown in FIG. 8, is connected to an associated one of the first worm gears 370 and 380 through the through holes 221 formed through the second gear plate 220.

Here, each of the stoppers 610 and 620 is constituted by a connection part 611, 621 having a diameter that can pass through the through holes 221, and a skirt 612, 622 that is stopped so as to prevent the stoppers 610 and 620 from being passing through the through holes toward the first worm gears 370 and 380, thereby being stopped by the through holes 221 at a location opposite to the first worm gears 370 and 380.

Herein, each of the elastic members 510 and 520 elastically presses an associated one of the stoppers 610 and 620 in the first direction 1st, thereby providing elastic force to each of the first worm gears 370 and 380. Here, the elastic members 510 and 520 elastically press the stoppers 610 and 620 in the state where one end of each of the elastic members 510 and 520 is supported by an associated one of the support plates 120 of the main frame 100.

Further, as shown in FIG. 4, the elastic members 510 and 520 respectively provides the elastic force to the first worm gears 370 and 380 in the first direction 1st, that is, in an upward direction in FIG. 4, and elastically support forward torque and reverse torque transmitted to the outside through the joint 3 and first worm gears 370 and 380, which will be described in detail, hereinafter.

According to the above configuration, referring to FIG. 4, the second gear plate 220 of the sliding frame 200, one support plate 120 of the main frame 100, one first gear plate 210 of the sliding frame 200, the other first gear plate 210 of the sliding frame 200, and the other support plate 120 of the main frame 100 are sequentially arranged along the first direction 1st.

In other words, the pair of first gear plates 210 are disposed between the pair of support plates 120, and the second gear plate 220 is disposed on a periphery of the pair of support plates 120, whereby one support plate 120 of the main frame 100 is between the second gear plate 220 of the sliding frame 200 and one first gear plate 210 of the sliding frame 200.

Herein, as shown in FIG. 7, one of the pair of support plates 120, which is disposed between the first gear plate 210 and the second gear plate 220, is formed with a plate through hole 121 such that a connecting plate 230 connecting the first gear plate 210 and the second gear plate 220 connects the first gear plate 210 and the second gear plate 220 through the plate through hole 121.

Figure 6:
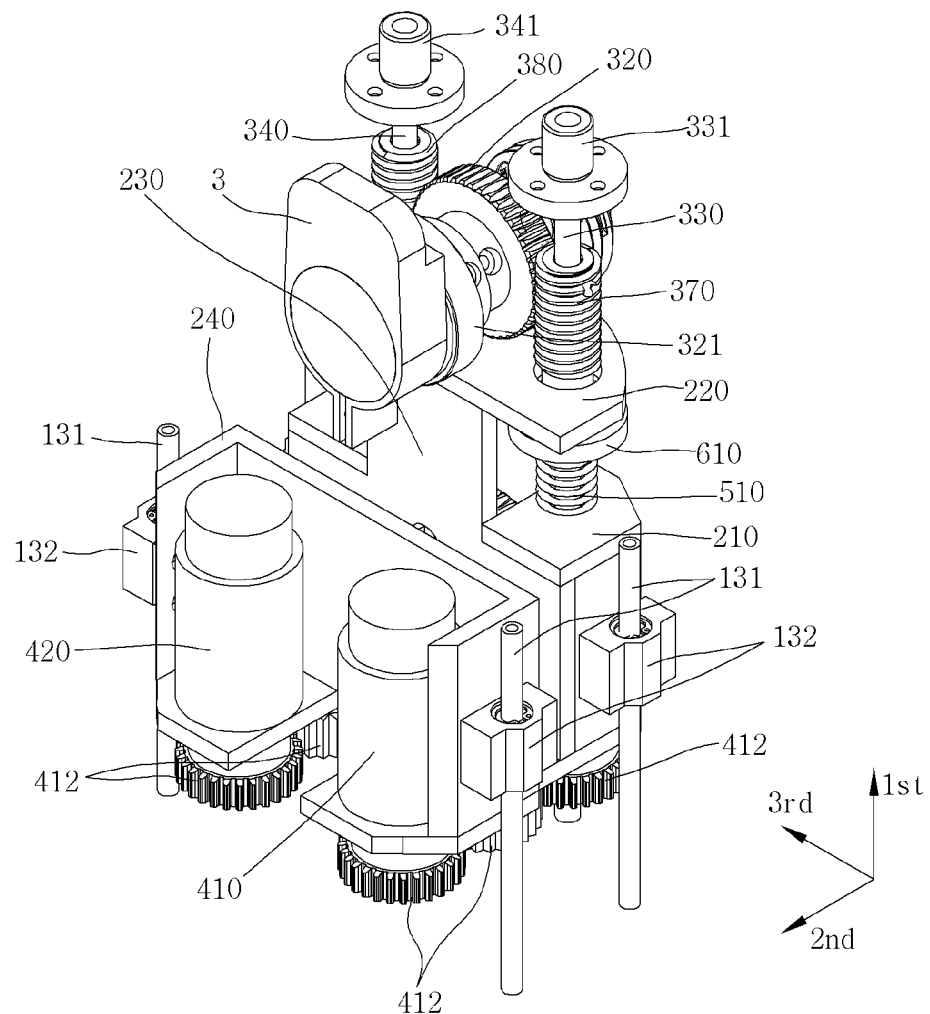
FIG. 6 shows a perspective view from the back side of FIG. 3.
Figure 9:
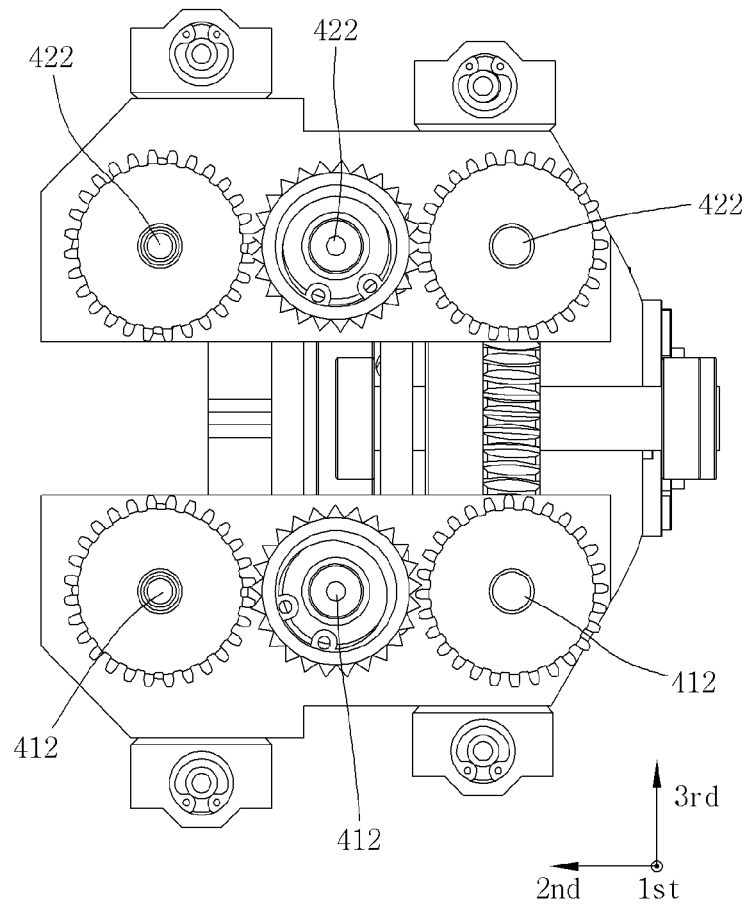
FIG. 9 shows a plan view from a first direction of FIG. 2.

Meanwhile, as shown in FIGS. 6 and 9, the first driving module 410 according to the present invention may include a first driving motor 411, and at least one first torque-transmitting member 412.

The first driving motor 411 generates torque, wherein in the present invention, it is exemplified that the first driving motor is provided to generate the torque on the first direction 1st, and as shown in FIG. 6, the sliding frame 200 is provided in a motor frame 240.

Further, as shown in FIG. 9, the first torque-transmitting member 412 is provided in the form of a plurality of transmission gears rotating by being engaged with each other so as to transmit the torque of the first driving motor 411 rotating on the first direction 1st to the first rotation shaft 330 rotating on the first direction 1st. In other words, the leftmost transmission gear in FIG. 9 may be connected to a rotation shaft of the first driving motor 411, and the rightmost transmission gear may be axis-connected to the first rotation shaft 330, thereby transmitting the torque of the first driving motor 411 to the first rotation shaft 330.

Similarly, the second driving module 420 may include a second driving motor 421, and at least one second torque-transmitting member 422, and a detailed description thereof is replaced by a description of the first driving module 410.

According to the above configuration, reference will be made in detail to an operation process of the actual implementation example of the variable stiffness robotic joint system 1 shown in FIGS. 2 to 9 with reference to [Table 1] and FIG. 10. As described in [Table 1], CW and CCW are rotation directions enabling the joint 3 to be rotated, do not mean the absolute rotation directions of the first driving motor 411, the second driving motor 421, the first worm gears 370 and 380, and the second worm gears 350 and 360.

Firstly, reference will be made to a process of adjusting the stiffness of the variable stiffness robotic joint system 1 according to the present invention.

Figure 10:
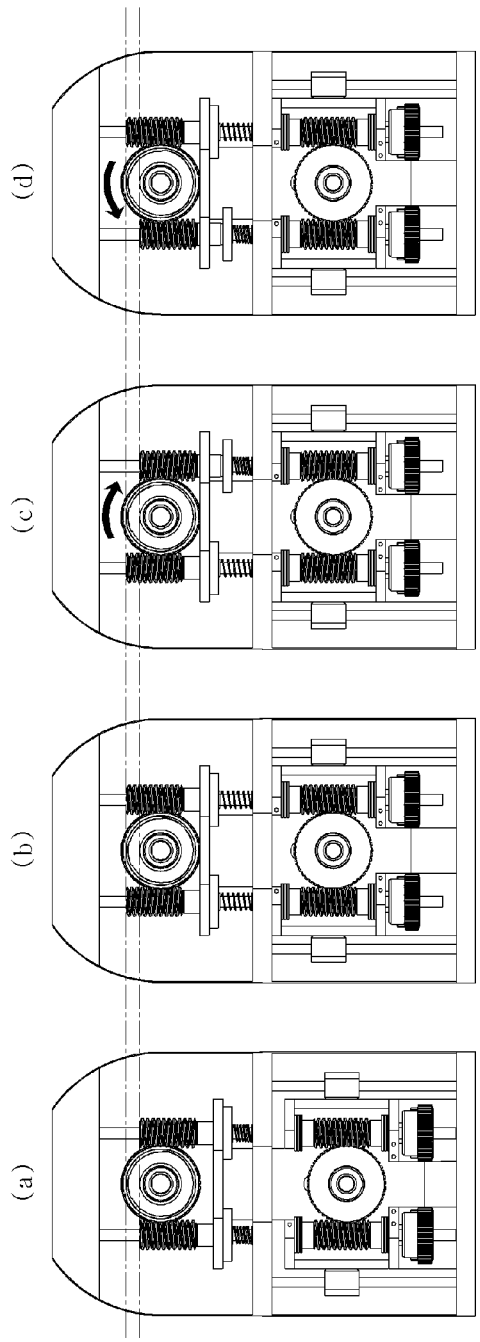
FIG. 10 shows views of motions of the variable stiffness robotic joint system of FIG. 2.

In the state shown in FIG. 10 (b), when the first driving motor 411 rotates in the clockwise direction and the second driving motor 421 rotates in the counterclockwise direction, the torque of the first driving motor 411 and the torque of the second driving motor 421 are transmitted to the first rotation shaft 330 and the second rotation shaft 340 by the first torque-transmitting member 412 and the second torque-transmitting member 422, whereby the first rotation shaft 330 and the second rotation shaft 340 are rotated on the first direction 1st.

Here, the first worm wheel 320 is not rotated since the pair of first worm gears 370 and 380 are rotated in directions in which the first worm wheel 320 is rotated in different directions. Herein, as described above, since a pair of the first worm wheels 320 slidingly move on the first rotation shaft 330 and the second rotation shaft 340 along the first direction 1st, locations at which the pair of first worm gears and the first worm wheel 320 are engaged with each other change by rotation amounts of the first rotation shaft 330 and the second rotation shaft 340.

Meanwhile, when the first driving motor 411 rotates in the clockwise direction and the second driving motor 421 rotates in the counterclockwise direction, the second worm wheel 310 is not rotated since the pair of second worm gears 350 and 360 are rotated in directions in which the second worm wheel 310 is rotated in different directions, and here, each of the second worm gears 350 and 360 is moved down while being rotated along the second worm wheel 310.

Further, as the pair of second worm gears 350 and 360 are moved down, the pair of first gear plates 210 supporting the pair of second worm gears 350 and 360 are also moved down, whereby the second gear plate 220 connected to the second worm gears is moved down.

Further, as the second gear plate 220 is moved down, the stoppers 610 and 620 stopped by the second gear plate 220 are also moved down, and as shown in FIG. 10 (a), each of the elastic members 510 and 520 disposed between the support plates 120 of the main frame 100 is compressed, whereby the stiffness of the variable stiffness robotic joint system 1 according to the present invention is increased.

On the contrary, in the state shown in FIG. 10 (a), when the first driving motor 411 rotates in the counterclockwise direction and the second driving motor 421 rotates in the clockwise direction, the torque of the first driving motor 411 and the torque of the second driving motor 421 are transmitted to the first rotation shaft 330 and the second rotation shaft 340 by the first torque-transmitting member 412 and the second torque-transmitting member 422, whereby the first rotation shaft 330 and the second rotation shaft 340 are rotated on the first direction 1st.

Here, as in the reverse rotation, locations of the first worm wheel 320 and the pair of first worm gears 370 and 380, at which the first worm gears 370 and 380 and the first worm wheel 320 are engaged with each other, change by rotation amounts of the first rotation shaft 330 and the second rotation shaft 340.

Meanwhile, when the first driving motor 411 rotates in the counterclockwise direction and the second driving motor 421 rotates in the clockwise direction, the second worm wheel 310 is not rotated since the pair of second worm gears 350 and 360 are rotated in directions in which the second worm wheel 310 is rotated in different directions, and here, each of the second worm gears 350 and 360 is moved up while being rotated along the second worm wheel 310.

Further, as the pair of second worm gears 350 and 360 are moved up, the pair of first gear plates 210 supporting the pair of second worm gears 350 and 360 are also moved up, whereby the second gear plate 220 connected to the second worm gears is moved up.

Further, as the second gear plate 220 is moved up, the stoppers 610 and 620 stopped by the second gear plate 220 are also moved up by the elastic force of the elastic members 510 and 520, and as shown in FIG. 10 (b), each of the elastic members 510 and 520 disposed between the support plates 120 of the main frame 100 is released, whereby the stiffness of the variable stiffness robotic joint system 1 according to the present invention is decreased.

Meanwhile, with regard to the rotational movement of the joint 3, when the first driving motor 411 and the second driving motor 421 rotate in the clockwise direction, the torque of the first driving motor 411 and the torque of the second driving motor 421 are respectively transmitted to the first rotation shaft 330 and the second rotation shaft 340 by the first torque-transmitting member 412 and the second torque-transmitting member 422, and according to the rotations of the first rotation shaft 330 and the second rotation shaft 340, the pair of first worm gears 370 and 380 and the pair of second worm gears 350 and 360 are rotated in engagement with the first worm wheel 320 and the second worm wheel 310, respectively, whereby the first worm wheel 320 and the second worm wheel 310 are rotated in the clockwise direction.

Accordingly, the joint 3 shafted to the first worm wheel 320 is rotated in the clockwise direction, thereby enabling movement of the joint 3 of the variable stiffness robotic joint system 1 according to the present invention. Here, the second worm wheel 310 is also rotated clockwise, so it is rotated in a direction in which the second worm wheel 310 and the pair of second worm gears 350 and 360 are rotated clockwise, whereby the positions of the pair of first worm gears 370 and 380 and the sliding frame 200 in the first direction 1st do not change, so the stiffness does not change.

Herein, the first worm gears 370 and 380 are respectively connected along the first rotation shaft 330 and the second rotation shaft 340 to be movable in the first direction 1st, and rotate along the first worm wheel 320 fixed to the main frame 100.

Similarly, when the first driving motor 411 and the second driving motor 421 rotate in the counterclockwise direction, the torque of the first driving motor 411 and the torque of the second driving motor 421 are transmitted to the first rotation shaft 330 and the second rotation shaft 340 through the first torque-transmitting member 412 and the second torque-transmitting member 422, and according to the rotations of the first rotation shaft 330 and the second rotation shaft 340, the pair of first worm gears 370 and 380 and the pair of second worm gears 350 and 360 are rotated in engagement with the first worm wheel 320 and the second worm wheel 310, respectively, whereby the first worm wheel 320 and the second worm wheel 310 are rotated in the counterclockwise direction.

Accordingly, the joint 3 shafted to the first worm wheel 320 is rotated in the counterclockwise direction, thereby enabling movement of the joint 3 of the variable stiffness robotic joint system 1 according to the present invention. Here, the second worm wheel 310 is also rotated clockwise, so it is rotated in a direction in which the second worm wheel 310 and the pair of second worm gears 350 and 360 are rotated clockwise, whereby the positions of the pair of second worm gears 350 and 360 and the sliding frame 200 in the first direction 1st do not change, so the stiffness does not change.

Meanwhile, when an external force is transmitted to the first worm wheel 320 through the joint 3, for example, as shown in FIG. 10 (c), when an external force is applied to rotate the joint 3 in the clockwise direction, the first worm wheel 320 applies a force to push down the right first worm gears 370 and 380, and here, the external force is elastically supported by the elastic force of the elastic members 510 and 520 supporting the first worm gears 370 and 380 through the right stoppers 610 and 620.

On the contrary, as shown in FIG. 10 (d), when an external force is applied to rotate the joint 3 in the counterclockwise direction, the first worm wheel 320 applies a force to push down the left first worm gears 370 and 380, and here, the external force is elastically supported by the elastic force of the elastic members 510 and 520 supporting the first worm gears 370 and 380 through the left stoppers 610 and 620.

In the above embodiment, it is exemplified that each of the first joint shaft rotation gear 310 and the second joint shaft rotation gear 320 of the first rotating module 10 and the second rotating module 30, and each of the first cross shaft rotation gears 350 and 360, and the second cross shaft rotation gears 370 and 380 are provided in the form of a worm wheel and a worm gear. In addition, other power transmission structures that can convert a rotation in the first direction 1st into a rotation in the second direction 2nd can be applied.

For example, each of the first joint shaft rotation gear 310 and the second joint shaft rotation gear 320 may be provided in the form of a ring gear, and each of the first cross shaft rotation gears 350 and 360 and the second cross shaft rotation gears 370 and 380 may be provided in the form of a pinion gear.

It is understood by those skilled in the art that the foregoing description is a preferred embodiment of the disclosed device and that various changes and modifications may be made in the invention without departing from the spirit and scope thereof.

[Description of reference characters of important parts]

1: variable stiffness robotic joint system
3: joint 100: main frame
10: first rotating module 30: second rotating module
100: main frame 110: main plate
120: support plate 130: plate guide
131: fixed shaft 132: sliding bearing module
140: side plate 150: roof plate
200: sliding frame 210: first gear plate
220: second gear plate 230: connecting plate
240: motor frame 310: second worm wheel
320: first worm wheel 330: first rotation shaft
340: second rotation shaft 350, 360: second worm gear
370, 380: first worm gear 410: first driving module
411: first driving motor 412: first torque-transmitting member
420: second driving module 421: second driving motor
422: second torque-transmitting member 510, 520: elastic member
610, 620: stopper

INDUSTRIAL APPLICABILITY

The present invention relates to a variable stiffness robotic joint system, which can be applied to the joint mechanism of robots used in manufacturing industrial sites, service sites, and the like.

The invention claimed is:

1. A variable stiffness robotic joint system comprising:
a first driving module and a second driving module configured to respectively generate torque which is rotated on a first direction;
a first rotating module configured to change rotations of the first driving module and the second driving module into rotations on a second direction intersecting the first direction when the first driving module and the second driving module rotate in directions in which a joint is rotated in a same direction, thereby rotating the joint;
a stiffness-providing member configured to provide stiffness by elastically supporting a rotational movement of the first rotating module on the second direction; and
a second rotating module configured to change rotations of the first driving module and the second driving module into a linear motion in the first direction when the first driving module and the second driving module rotate in directions in which the joint is rotated in different directions, thereby adjusting an elastic force of the stiffness-providing member.

2. The variable stiffness robotic joint system of claim 1 further comprising:
a first rotation shaft configured to rotate on the first direction according to the rotation of the first driving module, thereby transmitting the torque of the first driving module to the first rotating module and the second rotating module; and
a second rotation shaft configured to rotate on the first direction according to the rotation of the second driving module, thereby transmitting the torque of the second driving module to the first rotating module and the second rotating module.

3. The variable stiffness robotic joint system of claim 2, wherein
the first rotating module includes:
a first joint shaft rotation gear configured to rotate on the second direction to rotate the joint; and
a pair of first cross shaft rotation gears respectively axis-connected the first rotation shaft and the second rotation shaft and configured to rotate in engagement with the first joint shaft rotation gear so as to rotate the first joint shaft rotation gear when the first driving module and the second driving module rotate in directions in which the joint is rotated in the same direction, and
the second rotating module includes:
a sliding frame configured to vary the elastic force of the stiffness-providing member according to sliding movement in the first direction of the sliding frame;
a second joint shaft rotation gear configured to rotate on the second direction; and
a pair of second cross shaft rotation gears respectively axis-connected to the first rotation shaft and the second rotation shaft and configured to rotate in engagement with the second joint shaft rotation gear so as to move the sliding frame in the first direction when the first driving module and the second driving module rotate in directions in which the joint is rotated in different directions.

4. The variable stiffness robotic joint system of claim 3, wherein the stiffness-providing member includes a pair of elastic members configured to respectively elastically press the pair of first cross shaft rotation gears in the first direction.

5. The variable stiffness robotic joint system of claim 4, wherein the sliding frame includes a pair of first gear plates configured to support opposite sides of each of the second cross shaft rotation gears in the first direction, and to move with the pair of the second cross shaft rotation gears when the second cross shaft rotation gears linearly move in the first direction in engagement with the second joint shaft rotation gear according to rotations of the first rotation shaft and the second rotation shaft, thereby linearly moving the sliding frame in the first direction.

6. The variable stiffness robotic joint system of claim 5, wherein
the sliding frame further includes:
a second gear plate disposed between the first gear plates and the pair of first cross shaft rotation gears, and formed with a pair of through holes through which the first rotation shaft and the second rotation shaft pass, respectively,
the first rotating module further includes:
a pair of stoppers, each of the stoppers disposed at opposite sides of the pair of first cross shaft rotation gears, respectively with the second gear plate disposed between the pair of stoppers and the pair of first cross shaft rotation gears, and connected to the first cross shaft rotation gears through the through holes, respectively thereby being stopped by the through holes at the opposite sides of the first cross shaft rotation gears, respectively and
each of the elastic members elastically presses each of the stoppers in the first direction, respectively, to provide the elastic force to each of the pair of first cross shaft rotation gears, respectively.

7. The variable stiffness robotic joint system of claim 6, wherein the elastic members provide the elastic force respectively to the first cross shaft rotation gears in the first direction, so as to elastically support forward torque and reverse torque transmitted from an outside through the joint and the first cross shaft rotation gears.

8. The variable stiffness robotic joint system of claim 6, wherein the first cross shaft rotation gears are provided on the first rotation shaft and the second rotation shaft, respectively, so as to be freely movable in the first direction, thereby compressing or releasing the elastic members, respectively.

9. The variable stiffness robotic joint system of claim 5 further comprising:
a shaft supporting part configured to support each of the first rotation shaft and the second rotation shaft to be rotatable in the first direction; and
a main frame including a plate guide supporting the sliding frame to be linearly movable in the first direction.

10. The variable stiffness robotic joint system of claim 9, wherein
the main frame further includes a pair of support plates spaced apart from each other in the first direction, and
the plate guide includes:
a plurality of fixed shafts provided between the support plates along the first direction; and
a sliding bearing module provided on the sliding frame to move linearly along each of fixed shafts.

11. The variable stiffness robotic joint system of claim 10, wherein
the sliding frame further includes a connecting plate connecting the pair of first gear plates and the second gear plate,
the pair of first gear plates are disposed between the pair of support plates, and the second gear plate is disposed on a periphery of the pair of support plates, and
one of the pair of support plates, which is disposed between the first gear plates and the second gear plate, is formed with a plate through hole through which the connecting plate passes.

12. The variable stiffness robotic joint system of claim 10, wherein
the main frame further includes a main plate extending in the first direction to connect the pair of support plates to each other, and
the first joint shaft rotation gear and the second joint shaft rotation gear are rotatably provided on the main plate.

13. The variable stiffness robotic joint system of claim 3, wherein each of the first driving module and the second driving module includes:
a driving motor configured to generate torque; and
at least one torque-transmitting member configured to transmit the torque of the driving motor to the first and the second rotation shafts.

14. The variable stiffness robotic joint system of claim 13, wherein
the driving motor is mounted to the sliding frame such that a rotation axis of the driving motor is formed in the first direction, and
the torque-transmitting member is provided in a form of transmission gears that rotate by being engaged with each other.

15. The variable stiffness robotic joint system of claim 3, wherein
each of the first joint shaft rotation gear and the second joint shaft rotation gear is provided in a form of a worm wheel or a ring gear, and
each of the first cross shaft rotation gears and the second cross shaft rotation gears is provided in a form of a worm gear rotating in engagement with the worm wheel or in a form of a pinion gear rotating in engagement with the ring gear.

* * * * *